Dec. 3, 1946.        A. MOSCH        2,412,056
UTENSIL HOLDER
Filed Sept. 15, 1944        2 Sheets-Sheet 1
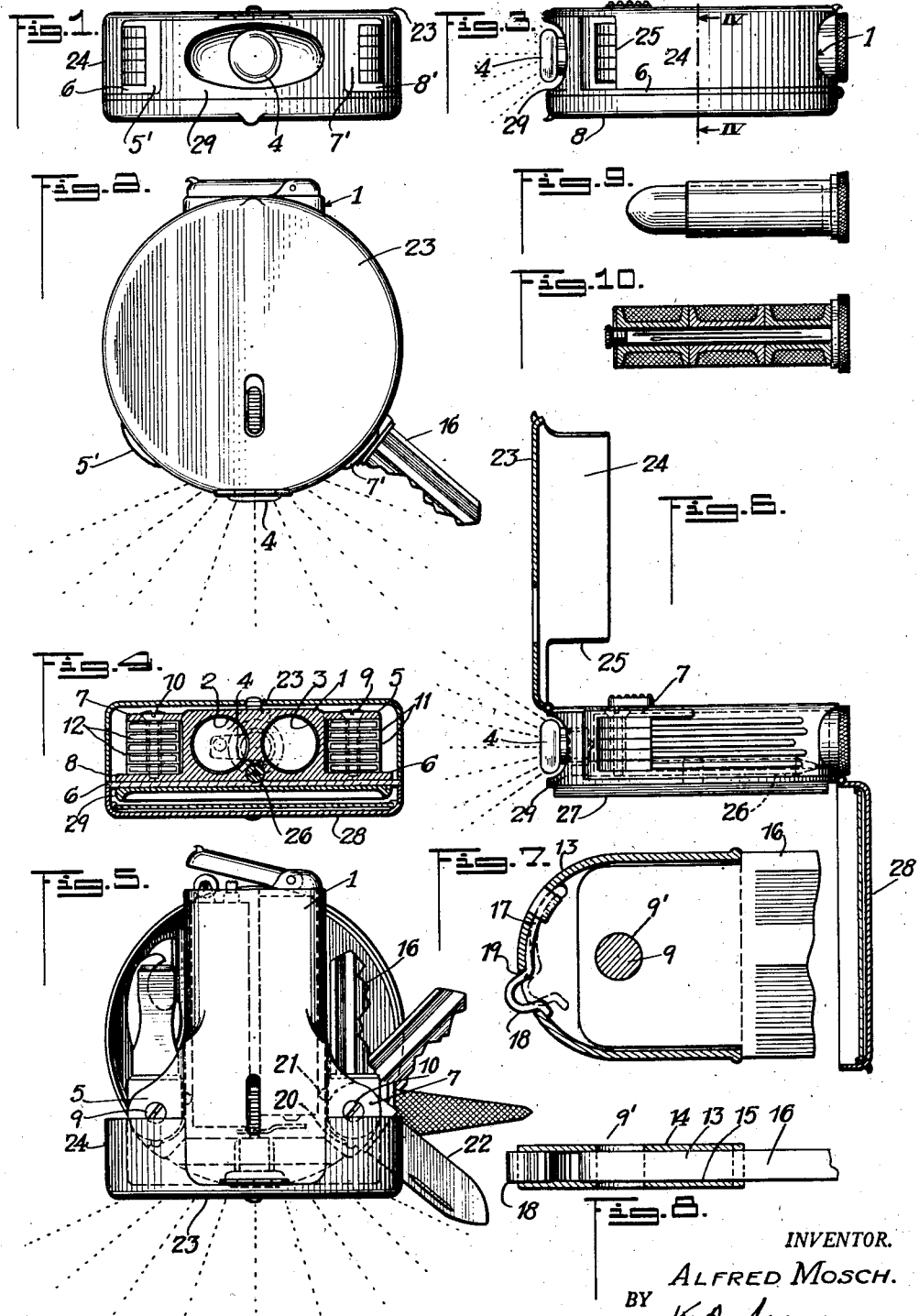
INVENTOR.
ALFRED MOSCH.
BY K. A. Mayr
ATTORNEY.

Dec. 3, 1946. A. MOSCH 2,412,056
UTENSIL HOLDER
Filed Sept. 15, 1944 2 Sheets-Sheet 2
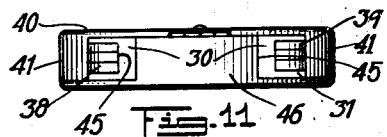
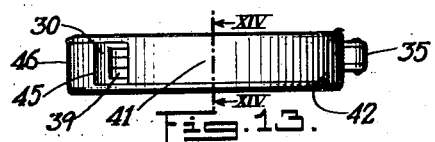
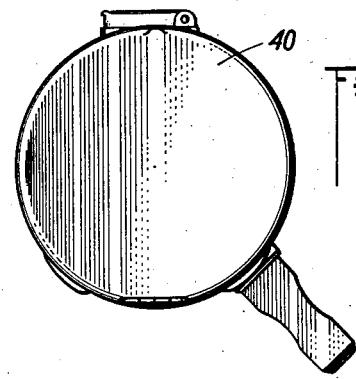
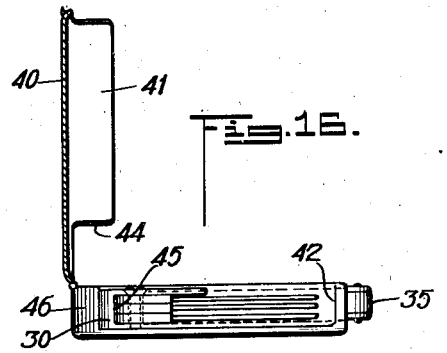
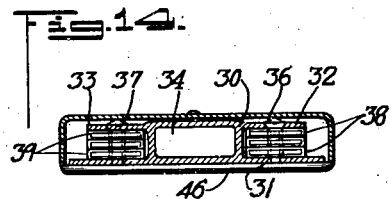
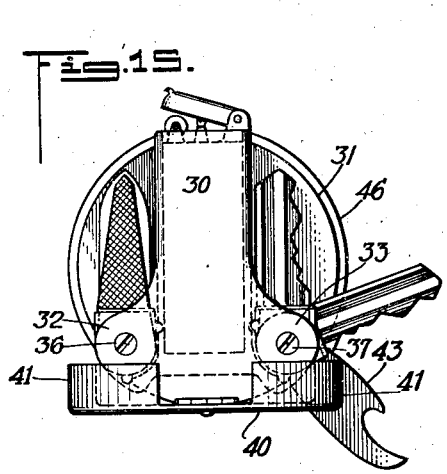
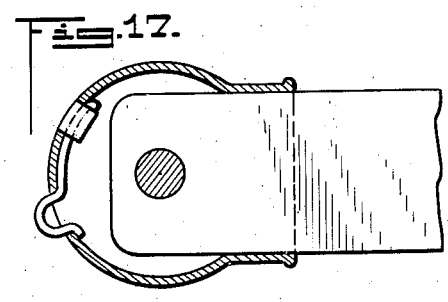
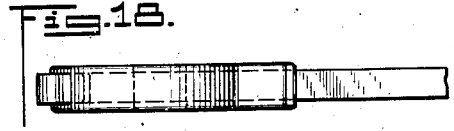
INVENTOR.
ALFRED MOSCH.
BY K.A. Mayr
ATTORNEY.

Patented Dec. 3, 1946

2,412,056

UNITED STATES PATENT OFFICE 2,412,056

UTENSIL HOLDER

Alfred Mosch, New York, N. Y.

Application September 15, 1944, Serial No. 554,208

8 Claims. (Cl. 206—38)

The present invention relates to a device for holding utensils and tools, more particularly for holding, serving as a handle, and encasing, like a compact, a plurality of utensils so that they can be safely carried in a pocket or handbag.

The present application is a continuation in part of my copending application Ser. No. 444,351, filed May 25, 1942, which has matured as Patent No. 2,371,308, dated March 13, 1945.

An object of the present invention is the provision of a new means for swingably, readily removably and exchangeably connecting a plurality of utensils or tools to a holder which may serve as a handle and/or casing for the utensils, and whereby it makes no difference whether all tools for which the device is built are connected or any number of tools is removed.

A further object of the present invention is the provision of means as characterized in the paragraph next above and including means for definitely holding the utensils or tools in predetermined positions, such as rest and operating position, with respect to the holder.

Another object of the present invention is the provision of a pocket-size, compact-like utensil holder comprising a core or body member to which the utensils are swingably connected and cover means for enclosing the utensils when in rest position and serving as a handle for the utensils when they are in operating position.

An object of the present invention resides in the provision of a compact-like utensil holder of the type set forth in the paragraph next above in which said member forms part of the outside surface of the compact.

An object of the present invention is the provision of a compact utensil holder of the type referred to above in which the utensils are securely held in operative or in rest position independently of the position of the covers, though the covers form a supplemental means for arresting the utensils in operative or rest position.

Further and other objects and advantages of the invention will be apparent from the accompanying specification and claims and shown in the drawings which, by way of illustration show what I now consider to be a preferred embodiment of my invention.

In the drawings:

Fig. 1 is a front view of the device according to the invention.

Fig. 2 is a top view of the device shown in Fig. 1 with one utensil in operating position.

Fig. 3 is a side view of the device shown in Fig. 1.

Fig. 4 is a cross sectional view of the device according to the invention taken along line IV—IV in Fig. 3 and looking in the direction of the arrows and with the tools removed.

Fig. 5 is a top view of the device according to Figs. 1 to 4 with the top cover in open position.

Fig. 6 is a side view of the device with the covers in open position and a portion of the body member and covers broken off, and showing a modification of the lower compartment.

Fig. 7 is an enlarged top view of a holding lock according to the invention, with the top plate removed.

Fig. 8 is a side view of the holding lock shown in Fig. 7, with the side wall removed.

Fig. 9 shows a lipstick holder, and

Fig. 10 is a longitudinal sectional view of a holder for thread spools and needles, as may be used in connection with the compact according to the invention.

Fig. 11 is a front view of a modification of the device according to the invention.

Fig. 12 is a top view of the device shown in Fig. 11 with one utensil in operating position.

Fig. 13 is a side view of the device shown in Fig. 11.

Fig. 14 is a sectional view of the device according to the invention with the tools removed and taken along line XIV—XIV in Fig. 13 and looking in the direction of the arrows.

Fig. 15 is a top view of the device according to Figs. 11 to 14 with the cover in open position.

Fig. 16 is a side view of the device with the cover in open position and a portion of the cover broken off.

Fig. 17 is a top view of a modified holding lock according to the invention, with the top plate removed.

Fig. 18 is a side view of the lock shown in Fig. 17.

Like parts are designated by like numerals in all figures of the drawings.

Referring more particularly to Figs. 1 to 10, I designates the body member which has two cavities: 2 housing the battery of a flashlight 4, and 3 housing a lighter. Instead of using the cavities for housing a battery and a flashlight, they may be used for accommodating a lipstick and holder as shown in Fig. 9, or thread spools and a holder therefor as illustrated in Fig. 10. A groove is provided for a pencil 26. The body member has flap or ear-like portions 5, 6 and 7, 8 protruding laterally and giving support to pin members 9 and 10 respectively.

Between the flap portions 5 and 6, and 7 and 8, and filed on pins 9 and 10 are the pockets or tool holding locks 11 and 12 respectively, which, in operating position, abut connecting portions 5' and 7' respectively.

An individual holding pocket or lock is shown in larger scale in Figs. 7 and 8. The pocket has a side wall portion 13 and a top and bottom plate portion 14 and 15. The tool 16, for example a key with its base portion filed to fit the pocket, is inserted and held by a pin member, for example 9, extending through holes 9' in the top and bottom plate and in the tool. A plate spring 17 is rigidly connected with the inside of the side wall portion 13 and has a locking portion 18 extending outside of the pocket through opening 19. The locking portion 18 is adapted to snap into suitable recesses 20 or 21 of the body member thereby definitely holding the pocket and the tool inserted therein in inoperative position, as key 16 in Fig. 5, or in operative position, as knife 22 in Fig. 5. A plurality of holding lock pockets 11 or 12 may be filed on member 9 or 10 and it makes no difference to the operability of the device whether all pockets are filled with utensils or not.

A top cover 23 is hinged to the casing member 29 and has flap portions 24 covering the tools when they are in rest position and leaving openings through which the holding locks 11 or 12 and part of the flap portions 5—8 and connecting portions 5' and 7' can be seen when the cover is closed and a tool protrudes in operative position.

At the rear of the device, the body member 1 forms part of the outside surface of the compact.

The lower portion of the casing member 29, in the modification shown in Fig. 6, is adapted to hold a note-book 27 which is enclosed by the bottom cover 28. Alternatively, the lower portion of the casing member may be shaped to hold a powder puff as is shown in Fig. 4.

The lower cover 28 is hinged to the casing 29 in substantially diametrically opposite position with respect to the bulb of flashlight 4 and carries a mirror at its inside. The flashlight throws light on the object which is reflected in the mirror.

Referring more particularly to Figs. 11 to 16, 30 designates a body member having a bottom surface 31 to which casing 46 is attached. The upper surface of the body member is smaller than its lower surface and has carrier portions 32 and 33 protruding laterally from a box-like portion 34 accommodating a lighter 35. Portions 32 and 33 are in a plane parallel to the bottom portion of the body member.

Pivot members 36 and 37 extend through said carrier portions and the bottom portion and swingably hold and serve as an axis for the tool holding locks or pocket members 38, 39 respectively, into which the tools or utensils are inserted.

Cover 40 has flap portions 41 which fit into recesses 42 which are filled and closed partly by the carrier portions 32 and 33 and partly by the locks 37 and 39. If a utensil is in operating position, as is the bottle opener 43 in Fig. 15, the respective lock pocket 39 with its utensil which is selected for use, extends through opening 45 and is held in operative position by the resilient snap mechanism connected with the lock pockets and described previously in connection with Figs. 7 and 8 and is held supplementarily by and between the marginal portions 44 of flaps 41 and 45 of the body member 30.

Figs. 17 and 18 show a modified lock pocket for the tools, having a rear portion extending over a larger angle whereby the stay portions 5' and 7', in Figs. 1 to 6, can be made larger and the opening between edges 25 and those of portions 5' and 7' can be reduced.

While I believe the above described embodiments of my invention to be preferred embodiments, I wish it to be understood that I do not desire to be limited to the exact details of design and construction shown and described, for obvious modifications will occur to a person skilled in the art.

I claim:

1. A holder for holding a plurality of utensils, comprising, in combination, a body member having two carrier portions disposed in substantially parallel relation to one another, a pivot member disposed between said carrier portions substantially at right angle thereto, a plurality of pocket shaped lock members swingably supported by said pivot member and adapted to individually receive and rigidly hold said utensils at an end portion thereof, resilient means connected individually with said lock members and comprising a snap catch portion, and recess means in said body member adapted to snappingly catch and fix said catch portion in a predetermined position.

2. A pocket-size device for holding a plurality of utensils, said device comprising, in combination, casing means adapted to be opened and closed and having an opening when closed, said utensils protruding through said opening when in operating position and being substantially enclosed within said casing means when in rest position and when said casing means are closed, a body member disposed substantially centrally and within said casing means and having structural portions, pivot means connected with said structural portions, and utensil holding means swingably connected with said pivot means and individually having pocket shaped portions, said utensils having end portions fitting into said pocket shaped portions and being individually surrounded and rigidly held thereby.

3. A pocket-size device for holding a plurality of utensils, said device comprising, in combination, casing means adapted to be opened and closed and having an opening when closed, said utensils protruding through said opening when in operating position and being substantially enclosed within said casing means when in rest position and when said casing means are closed, a body member disposed substantially centrally and within said casing means and having structural portions, pivot means connected with said structural portions and a plurality of utensil holding means swingably connected with said pivot means and individually having pocket-like portions shaped to close said openings when the device is closed and said utensils are in rest position, said utensils individually having end portions closely fitting, individually, into said pocket portions and being individually surrounded and rigidly held thereby.

4. A pocket-size device for holding a plurality of utensils, said device comprising, in combination, casing means adapted to be opened and closed and having, when closed, openings at substantially opposite sides, said utensils protruding through one of said openings when in operating position and being substantially enclosed within said casing means when in rest position and when said casing means is closed, a body member disposed substantially centrally within said casing means and having opposedly protruding structural portions, pivot means connected with said structural portions, and a plurality of utensil holding means swingably connected with said pivot means and having pocket-like portions, said utensils having end portions closely fitting into said pocket portions and adapted to be individually removably and exchangeably inserted thereinto.

5. A device as set forth in claim 2 wherein said body member comprises a container portion containing an additional utensil and said structural portions have a flap like configuration and protrude from said container portion.

6. A device as set forth in claim 2, said casing means having a substantially flat and rotund outside configuration and comprising an annular outside surface portion, said body member comprising a portion extending through said annular surface portion and forming part of the outside surface of said device.

7. A device as set forth in claim 2, said body member having marginal portions abutting the pocket portion of the holding means of a selected utensil when in operating position, and said casing means having marginal portions which, when said casing means are closed, also abut the pocket portion of a utensil in operating position, and the marginal portions of said body member and of said casing means, when closed, rigidly holding the selected utensils in between and preventing any swinging motion thereof.

8. A pocket size device for holding a plurality of utensils, said device comprising, in combination, casing means adapted to be opened and closed and having an opening when closed, said utensils protruding through said opening when in operating position and being substantially enclosed within said casing means when in rest position and when said casing means are closed, a body member disposed substantially centrally and within said casing means and having structural portions, pivot means connected with said structural portions, and utensil holding means swingably connected with said pivot means and individually having pocket shaped portions, said utensils having end portions fitting into said pocket shaped portions and being individually surrounded and rigidly held thereby, lock means resiliently connected with said holding means, said body member comprising lock means engaging means adapted to engage and firmly hold said lock means and thereby said utensil holding means in predetermined positions, said body member having marginal portions abutting the pocket portion of the holding means of a selected utensil when in operating position and said casing means having marginal portions which, when said casing means are closed, also abut the pocket portion of a utensil in operating position, and the marginal portions of said body member and of said casing means, when closed, supplementally rigidly holding the selected utensil in between and preventing any swinging motion thereof.

ALFRED MOSCH.